(12) United States Patent
Grivas et al.

(10) Patent No.: US 6,246,862 B1
(45) Date of Patent: Jun. 12, 2001

(54) SENSOR CONTROLLED USER INTERFACE FOR PORTABLE COMMUNICATION DEVICE

(75) Inventors: Chris J. Grivas, Crystal Lake; Rachid M. Alameh, Schaumburg; Fan He, Grayslake, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/244,267

(22) Filed: Feb. 3, 1999

(51) Int. Cl.$^7$ ................................................ H04M 11/00
(52) U.S. Cl. ................ 455/90; 455/95; 455/575
(58) Field of Search .................. 455/90, 575, 95, 455/414, 425

(56) References Cited

U.S. PATENT DOCUMENTS

| | | | |
|---|---|---|---|
| D. 390,509 | 2/1998 | Antzinas et al. | D14/138 |
| 4,715,673 | 12/1987 | Noro et al. | 350/96.2 |
| 4,868,912 | 9/1989 | Doering | 340/706 |
| 5,010,566 | 4/1991 | Seo | 379/61 |
| 5,224,151 * | 6/1993 | Bowen et al. | 379/58 |
| 5,379,319 | 1/1995 | Satoh et al. | 379/387 |
| 5,684,294 | 11/1997 | Kouhi | 250/214 |
| 5,715,524 | 2/1998 | Jambhekar et al. | 455/90 |
| 5,729,604 * | 3/1998 | Van Schyndel | 379/388 |
| 5,832,296 * | 11/1998 | Wang et al. | 395/823 |
| 5,884,156 | 3/1999 | Gordon | 455/350 |

FOREIGN PATENT DOCUMENTS

| | | |
|---|---|---|
| 0924915 | 6/1999 | (EP) . |
| 2256772 | 12/1992 | (GB) . |
| 360150321A * | 8/1985 | (JP) . |

OTHER PUBLICATIONS

Aiken et al., "Low Profile Eject Stylus", U.S.Ser. No. 08/816,649, filed Mar. 13, 1997, Attorney Docket No. CE01941R.

Alameh et al., "Efficient Encoding and Detection Method and Device for Binary Intensity Modulated Optical Data Signals", U.S.Ser. No. 08/940,905, filed Sep. 30, 1997, Attorney Docket No. CR00129M.

Qualcomm "pdQ 800 Dual Moe CDMA Digital and Analog Smartphone" Preliminary Product Sheet, Sep. 1998.

* cited by examiner

*Primary Examiner*—Daniel Hunter
*Assistant Examiner*—Thuan T. Nguyen
(74) *Attorney, Agent, or Firm*—Mark D. Patrick; Hisashi D. Watanabe

(57) ABSTRACT

A portable communication device (100) that has a processing section (208) to control operation of the portable communication device (100) in response to an input signal (TS_INPUT) and a user interface having a touch sensitive input device (128) for generating the input signal (TS_INPUT), also has a sensor (134). The sensor (134) disables the touch sensitive input device (128) from generating the input signal (TS_INPUT) when the portable communication device (100) is positioned in close proximity to a user and, thereby, preventing inadvertent actuations while the user holds the portable communication device (100) against his or her head to facilitate communication.

20 Claims, 4 Drawing Sheets

SENSOR CONTROLLED USER INTERFACE FOR PORTABLE COMMUNICATION DEVICE

FIELD OF THE INVENTION

The present invention relates generally to portable communication devices and more particularly to using a sensor to control a user interface of a portable communication device.

BACKGROUND OF THE INVENTION

The manufacture and sale of portable communication devices, such as portable radiotelephones, has become a competitive business. To succeed, portable communication device providers must continually work to not only meet, but exceed, consumer demands. In doing so, portable communication device providers have improved the user interface of the portable communication device. One way of improving the user interface is by adding a touch sensitive input device, such as a touch screen or touch pad, to the user interface. Actuation of the touch sensitive input device allows a user to control operation of a portable communication device via finger tip touching or handwriting. One type of portable communication device that is known to incorporate a touch sensitive input device is a "smartphone." The smartphone is a single portable device in which radiotelephone functionality and personal computer (PC) or personal digital assistant (PDA) functionality are integrated. An example of a smartphone is shown and described in U.S. Pat. No. 5,715,524 to Jambhekar et al., entitled "Radio Communication Device With Movable Housing Element Control" issued on Feb. 3, 1998 and assigned to Motorola, Inc., the assignee of the present application.

Incorporating a touch sensitive input device into a user interface is problematic. Conventional user interfaces of portable radiotelephones, which include a speaker, a display, a keypad and a microphone, are arranged wholly on one side of the portable radiotelephone. It is desired to put the touch sensitive input device on the same side of the portable radiotelephone as the display because at least some actuations to the touch sensitive input device are replicated or tracked on the display. However, when the touch sensitive input device is carried on the same side of the portable radiotelephone as the speaker and microphone, the touch sensitive input device becomes susceptible to inadvertent actuations by a user's head while the user is listening at the speaker and/or speaking into the microphone.

Therefore, what is needed is a new way to control the user interface of a portable communication device such that, for example, a touch sensitive input device employed in the user interface is not inadvertently actuated while the portable communication device is positioned against the user's head.

DETAILED DESCRIPTION OF THE PREFERRED EMBODIMENTS

A portable communication device that has a processing section to control operation of the portable communication device in response to an input signal and a user interface having a touch sensitive input device for generating the input signal, also has a sensor. The sensor disables the touch sensitive input device from generating the input signal when the portable communication device is positioned in close proximity to a user. By using this arrangement, inadvertent actuations are prevented while the user holds the portable communication device against his or her head to facilitate communication.

Figure 1:
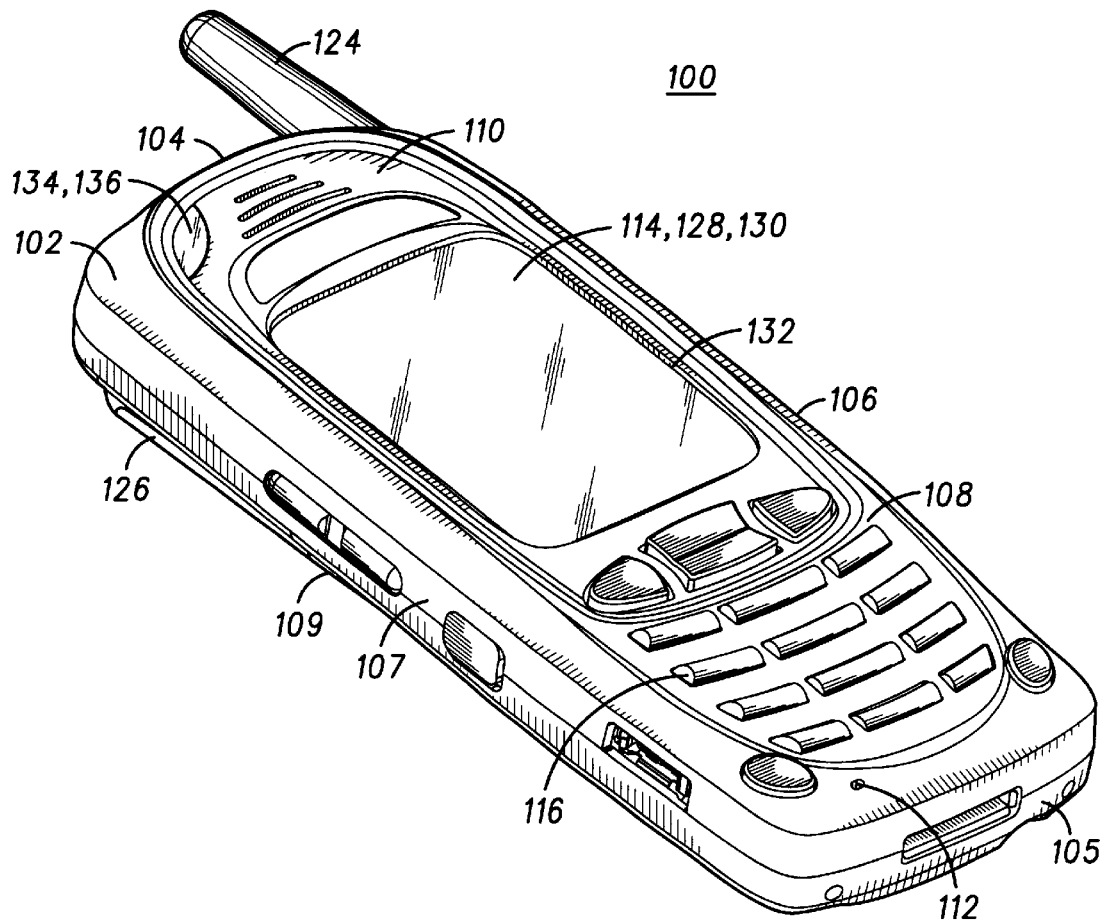
FIG. 1 is a perspective view of a portable communication device employing a sensor controlled user interface.

FIG. 1 illustrates one type of portable communication device—a smartphone 100. The smartphone 100 is defined by a housing 102 preferably molded from plastic or other suitable material to have top and bottom ends 104 and 105, right and left sides 106 and 107 and front and rear sides 108 and 109 that are integrally joined in a substantially rectangular solid configuration. A thickness of the housing 102, which is generally defined by a width of the ends 104 and 105 and the sides 108 and 109, and a width of the housing 102, which is generally defined by the length of the ends 104 and 105 and the sides 108 and 109, are sized to allow a user to hold the smartphone 100 in a single hand. In the illustrated embodiment, the width and thickness of the housing 102 are approximately 60 mm and approximately 25 mm, respectively. A length of the housing 102, which is generally defined by the length of the sides 106–109, is sized to ensure that user interface components—a speaker bezel 110 behind which a speaker 202 (see FIG. 2) is positioned and a microphone aperture 112 behind which a microphone 204 (see FIG. 2) is positioned—can be located on the front side 108 and be sufficiently spaced to ensure that, when the smartphone 100 is held to a user's head such that the speaker bezel 110 is positioned at the user's ear, the microphone aperture 112 can be positioned in close proximity to the user's mouth. In the illustrated embodiment, the length of the housing 102 is approximately 150 mm. The smartphone 100 further includes additional user interface components—a display 114 and a plurality of keys extending through a plurality of corresponding openings formed in the front side 108 to form a keypad 116. The display 114 and the keypad 116 are located at the front side 108 between the speaker bezel 110 and the microphone aperture 112. The keypad 116 is a conventional radiotelephone keypad with 0–9, *, #, power, function, send, end and menu navigation keys. The smartphone 100 also includes an antenna 124 located at the top end 104 and a removable battery pack 126 attached to the rear side 109.

The smartphone 100 has a touch sensitive input device in the form of a touch screen 128 integrated into the display 114. The touch screen 128, which is actuated by touches to its external surface, occupies a first layer of the display 114 that overlies, and coextends with, a second layer of the display 114, which is occupied by a liquid crystal display (LCD) 130. The display 114 is positioned in the housing 102 so that the external surface of the touch screen 128 resides in a large substantially rectangular opening 132 formed in the front side 108 between the speaker bezel 110 and the keypad 116. The touch screen 128 is fabricated using a known technique and from plastic film, glass or other suitable transparent material that would not hinder viewing of the LCD 130. The touch screen 128 and the LCD 130 fill the opening 132 such that the dimensions of the opening 132 approximate a maximum user actuatable area of the touch screen 128 and a maximum viewing area of the LCD 130. In the illustrated embodiment, the opening 132 is 2344.75 mm^2 (56.5 mm×41.5 mm) or just slightly larger than twenty-five percent of the area of the front side 108 (150 mm×60 mm=9000 mm^2). The area of the opening 132 is preferably not less than twenty-five percent of the area of the front side 108 so as to better facilitate PC or PDA functions, as will be discussed further below. Unfortunately, the large user actuatable area makes the touch screen 128 extremely susceptible to inadvertent actuations by a user's face when the user is participating in a telephone call (i.e., listening at the speaker bezel 110 while speaking into the microphone aperture 112).

Although the touch sensitive input device is shown and described herein as a touch screen that overlies, and coextends with, a display, it will be recognized that the touch sensitive input device could alternately be a touch screen that overlies only a portion of the display or be a touch screen or a touch pad positioned separate and apart from the display but still in a location where it is susceptible to inadvertent actuations by a user's face or head.

To prevent inadvertent actuations by a user's face, the smartphone 100 has a sensor 134 that triggers when brought into close proximity to the user and, while triggered, disables the touch sensitive input device. The sensor 134 is best positioned on the smartphone 100 in a location that is guaranteed to be obstructed by the user's head when the user is participating in a telephone call and to not be obstructed when the user is inputting information via the touch screen 128 or the keypad 116. In the illustrated embodiment, the sensor is positioned in the speaker bezel 110 on the front side 108 of the housing 102. During a telephone call, a user's ear is typically pressed against the speaker bezel 110 to achieve an acoustical seal that maximizes hearing of the audible speech output by the speaker 202 of FIG. 2. This is particularly the case when the user is located in a noisy environment while participating in a telephone call.

Figure 2:
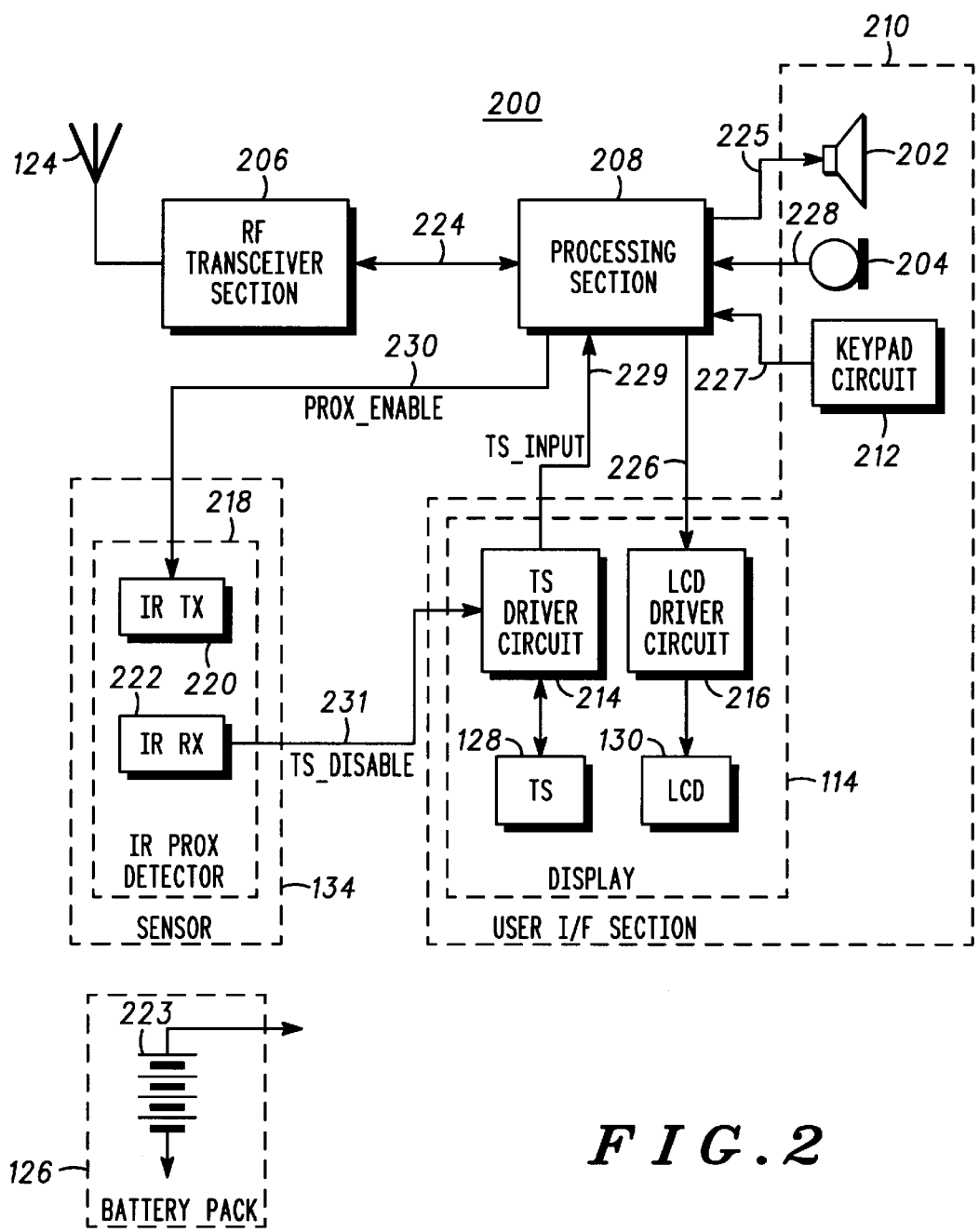
FIG. 2 is a circuit block diagram of electrical circuitry of the portable communication device of FIG. 1.

The sensor 134 is an infrared (IR) proximity detector 218 (see FIG. 2). The IR proximity detector 218 has an IR transmitting element (see, for example, IR emitter 316 of FIG. 3) and an IR receiving element (see, for example, photodiode 408 of FIG. 4) that are mounted side by side in the housing 102 behind a lens 136 of the IR proximity detector 218. The lens 136 has an outer surface that is flush with the front side 108 of the housing 102 at the speaker bezel 110. The IR transmitting element is positioned to direct an IR light transmission beam upward through the lens 136 and away from the front side 108 of the housing 102. The IR receiving element is positioned to receive reflections of the IR transmission beam that travel towards the front side of the housing 102 and through the lens 136. An isolating wall (not shown) extends beneath the lens 136 and between the IR transmitting and receiving elements. The wall prevents the IR receiving element from directly receiving IR light transmitted by the IR transmitting element. The lens 136 is a visible light blocking filter that attenuates ambient light (e.g., sunlight, incandescent light, and fluorescent light) which can be received by the IR receiving element and falsely interpreted by the sensor 134 as IR light from the IR transmission beam. In the illustrated embodiment, the IR transmitting element is set to a narrow IR transmission angle and a very low average power level to localize the IR transmission beam to a sensing region that extends perpendicularly away from the outer surface of the lens 136 to a plane that is approximately 5 cm above the lens 136. The IR receiving element is set to have a wide receiving angle for maximum field of view reception. The sensor 134 triggers when an object such as the user's head is brought within the sensing region and reflects the IR transmission beam back to the IR receiving element. Even when there is no separation between the outer surface of the lens 136 and the user's head, the IR transmission beam is internally reflected back to the IR receiving element. This internal reflection can be accomplished in two ways: (1) through the lens 136 by relying on its thickness to direct reflected IR waves into the receiving element, in which case the isolating wall can be extended to contact the lens 136; or (2) through a gap between the isolating wall and the lens 136, thus eliminating the need for the lens 136 to be thick. The sensor 134 untriggers when the object is removed from the sensing region.

The smartphone 100 has electrical circuitry 200, as shown in FIG. 2, mounted on one or more circuit boards (not shown) positioned in the housing 102 of FIG. 1. The electrical circuitry 200 includes the antenna 124; a radio frequency (RF) transceiver section 206; a processing section 208; a user interface section 210 including the speaker 202, the microphone 204, a keypad circuit 212, the display 114 made up of the touch screen 128, a touch screen driver circuit 214, the LCD 130 and a LCD driver circuit 216; the sensor 134 including the IR proximity detector 218 made up of an IR transmitter 220 and an IR receiver 222; and the battery pack 126 including a battery cell 223. The speaker 202, the microphone 204, the RF transceiver section 206, the keypad circuit 212, the display 114 and the sensor 134 are shown directly coupled to the processing section 208. Although the battery cell 223 of the battery pack 126 is shown to be unconnected in FIG. 2, it will be understood that the battery cell 223 provides the power necessary for operation of the electrical circuitry 200 until the battery cell 223 becomes depleted or the battery pack 126 is detached from the rear side 109 of the housing 102.

The processing section 208 controls the smartphone 100 to perform both PC or PDA functions, such as composing a note, and radiotelephone functions, such as making wireless telephone calls or sending and receiving short messages or pages. To carry out these functions, the processing section 208 comprises one or more interconnected processing devices, such as digital signal processors and microprocessors; and memory devices accessible by the processing devices, such as flash memory, read-only memory and random-access memory. PC or PDA functions are generally carried out by the display 114 and the processing section 208. The processing section 208 signals the LCD driver circuit 216 via connection 226 to drive the LCD 130 to display visual information in a form, such as an array of graphical buttons or a blank tablet, that invites user input, preferably in the form of touches by the user's finger or by a stylus manipulated by a user. The touch screen driver circuit 214 provides a signal TS_INPUT to the processing section 208 via connection 229 in response to touches to the surface of the touch screen 128, preferably by the user's finger or by a stylus manipulated by a user. The processing section 208, responsive to the signals from the touch screen driver circuit 214, may further signal the LCD driver circuit 216 via connection 226 to drive the LCD 130 to graphically replicate or track the user's touches to the surface of the touch screen 128, such as by highlighting buttons or displaying handwriting.

Radiotelephone functions generally require that the smartphone 100 establish and maintain wireless communication with a remote device, such as a cellular base station. RF signals sent by the remote device are received at the RF transceiver section 206 via the antenna 124. The RF transceiver section 206, under the control of the processing section 208, transforms the RF signals into receive signals through downconversion and demodulation. The receive signals are coupled to the processing section via connection 224 where they are decoded and processed for output to the user. The processing section 208 drives the speaker 202 via connection 225 to produce audible speech derived from speech information recovered from the receive signals. The processing section 208 signals the LCD driver circuit 216 via connection 226 to drive the LCD 130 to display visual information derived from control information recovered from the receive signals.

RF signals sent from the smartphone 100 to the remote device are generated as follows. The keypad circuit 212 provides signals to the processing section 208 via connection 227 in response to actuation of the keypad 116 of FIG. 1. The microphone 204 provides transduced audible speech signals to the processing section 208 via connection 228. The touch screen driver circuit 214 provides the signal TS_INPUT to the processing section 208 via connection 229 in response to actuation of the touch screen 128. The processing section 208 processes and codes the signals received via connections 227–229 into transmit signals. The transmit signals are coupled to the RF transceiver section 206 via connection 224. The RF transceiver section 206, under the control of the processing section 208, transforms the transmit signals into RF signals through modulation and amplification, and couples the RF signals to the antenna 124 for emission.

Prior to establishing communication with the remote device, the processing section 208 enables the sensor 134. The processing section 208 sends a signal PROX_ENABLE to the IR transmitter 220 of the IR proximity detector 218 via connection 230. The IR transmitter 220, in response to receiving the signal PROX_ENABLE, begins emitting the IR transmission beam in the manner discussed above. The IR receiver 222 sits idle waiting for the IR transmission beam to be reflected. Upon receiving the reflected IR transmission beam, the IR receiver 222 sends a signal TS_DISABLE to the touch screen driver circuit 214 via connection 231. The touch screen driver circuit 214, in response to receiving the signal TS_DISABLE, disables communication of the signal TS_INPUT on connection 229. Communication of the signal TS_INPUT remains disabled until the IR receiver 222 stops receiving the reflected IR transmission beam. Once stopped, the IR receiver 222 stops sending the signal TS_DISABLE on connection 231 which, in turn, causes the touch screen driver circuit 214 to enable communication of the signal TS_INPUT on connection 229.

The relatively large size of the display 114 and the multi-functional processing requirements of the processing section 208 make the smartphone 100 susceptible to high current drain. As such, the smartphone 100 must be sensitive to battery power conservation. The IR proximity detector 218 is specifically designed to minimize power consumption.

Figure 3:
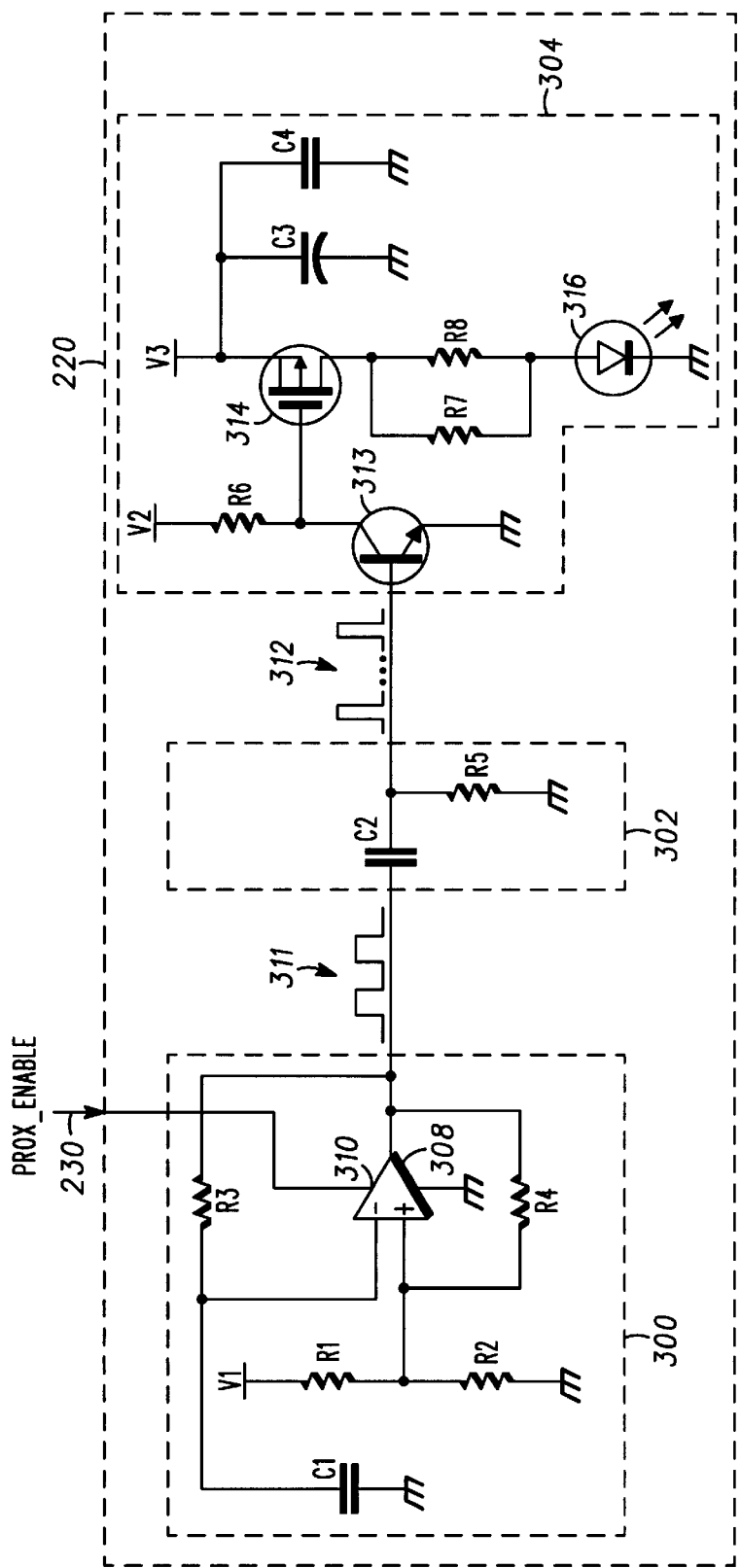
FIG. 3 is an electrical circuit schematic of an infrared (IR) transmitter employed by the sensor controlled user interface.

The IR transmitter 220, which is shown in more detail in FIG. 3, is made up of an oscillator section 300, a pulse shaping section 302 and a transmit section 304. The oscillator section 300 includes an operational amplifier 308, resistors R1, R2, R3 and R4, a capacitor C1 and a voltage supply V1 interconnected as shown in FIG. 3. A supply port 310 of the operational amplifier 308 is connected to connection 230 to receive the signal PROX_ENABLE, which in the illustrated embodiment has a voltage level equal to the supply voltage required for the operational amplifier 308 to operate. The resistors R1, R2, R3 and R4, the capacitor C1 and the voltage supply V1 are valued so as to set the operational amplifier 308, when operating, to oscillate at a low frequency, such as 25 Hz, and generate a square wave signal 311 characterized by a 50% duty cycle. Suitable values for the resistors R1, R2, R3 and R4, the capacitor C1 and the voltage supply V1 are 4.7 kΩ, 4.7 kΩ, 100 kΩ, 20 kΩ, 1 μF and 3.3 V, respectively.

The pulse shaping section 302 includes a capacitor C2 and a resistor R5 interconnected as shown in FIG. 3 to form a differentiator. The capacitor C2 and the resistor R5 are valued to transform the continuous square wave signal output by the oscillator section 300 into a pulsed signal 312. The pulsed signal 312 is characterized by narrow pulses and a long separation periods between consecutive pulses. The duration of each pulse should be sufficiently small to minimize transmit current. The separation periods between consecutive pulses should be long enough to minimize the average transmit current but not too long in order to guarantee reception of the reflected IR transmission beam regardless of the speed a user can move the smartphone 100 into close proximity to his or her head. Suitable values for the pulsed signal 312 are a 10 μs pulse duration and a 40 ms separation period between consecutive pulses, defining a very low 0.025% duty cycle. The pulse duration could be as small as 50 ns which is limited by the bandwidth of commercially available transmitting diodes. The separation period could be as long as 0.5 secs. which is still fast enough to guarantee proper proximity detection as compared to the speed a user moves the smartphone 100 into close proximity to his or her head. Suitable values for the resistor R5 and the capacitor C2 are 1 kΩ and 0.01 μF, respectively.

The transmit section 304 includes a bipolar junction transistor (BJT) 312, a p-channel field effect transistor (FET) 314, resistors R6, R7 and R8, capacitors C3 and C4, voltage supplies V2 and V3 and a light emitting diode (LED) IR emitter 316 interconnected as shown in FIG. 3. The arrangement of the BJT 313, the resistor R6 and the voltage supply V2 amplifies the magnitude of the narrow pulse output by the pulse shaping section 302. The pulse is amplified in magnitude to increase transmission power without increasing transmission duration. The amplified narrow pulse is fed to the gate of the FET 314. The FET 314 turns on at the positive slope of the narrow pulse and turns off at the negative slope of the narrow pulse. When on, the FET 314 drives the IR emitter 316 with high peak power. The capacitors C3 and C4 are power supply filtering capacitors to provide surge peak current. The resistors R7 and R8 are current limiting resistors to limit the current to the IR emitter 316. When driven, the IR emitter 316 transmits an IR light pulse for each narrow pulse output by the pulse shaping section 302, thereby, collectively forming an IR transmission beam of IR light pulses. The IR emitter 316 of the IR transmitter 220 is a comparatively high power consuming device with a peak current drain of approximately 450 mA when transmitting. By driving the IR emitter 316 with the pulsed signal 312 rather than with the continuous square wave signal 311, the IR transmitter 220 will transmit less often and for a shorter duration thereby minimizing power consumption. Suitable values for the resistors R6, R7 and R8, the capacitors C3 and C4 and the voltage supplies V2 and V3 are 4.7 kΩ, 3.3 Ω, 3.3 Ω, 4.7 μF, 27 pF, 3.3 V and 3.3 V, respectively.

Figure 4:
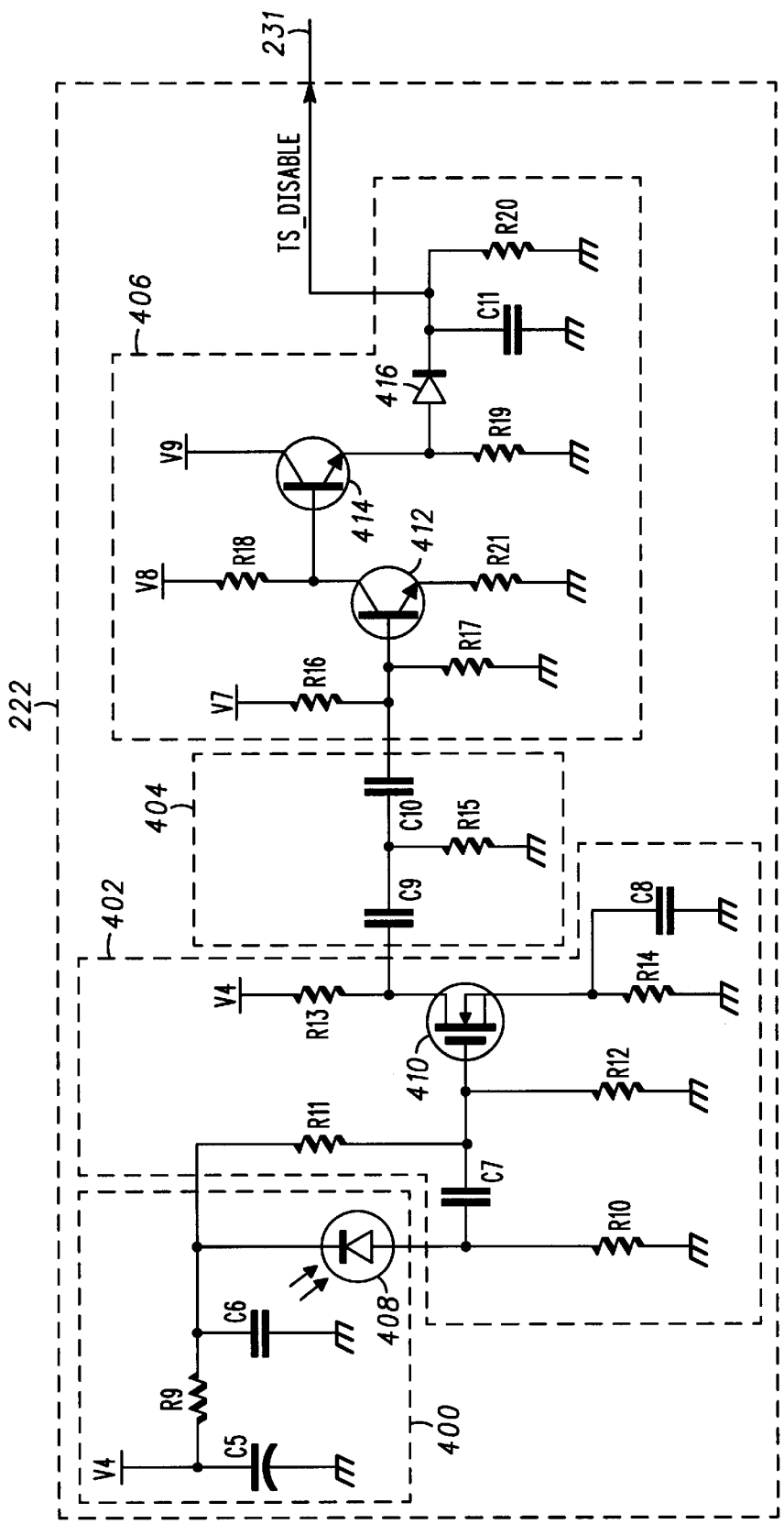
FIG. 4 is an electrical circuit schematic of an IR receiver circuit employed by the sensor controlled user interface.

The IR receiver 222, which is shown in more detail in FIG. 4, is made up of a receive section 400, an amplifier section 402, a filter section 404 and an amplifier and hold section 406. To minimize power consumption, the IR receiver 222 has been designed to draw only a small amount of current, such as 900 μA, when activated. The receive section 400 includes a photodiode 408, a resistor R9, capacitors C5 and C6 and a voltage supply V4 interconnected as shown in FIG. 4. The photodiode 408 is fed at its cathode with a very clean, low noise voltage supply derived from the voltage supply V4, which is filtered by the arrangement of the capacitors C5 and C6 and the resistor R9. The photodiode 408 operating in the photoconductive mode is connected in the reverse bias direction shown in FIG. 4. When an IR light pulse from the reflected IR transmission beam is incident on the photodiode 408, a reverse photodiode current of approximately 0.8 $\mu$A to 1.6 $\mu$A flows from the anode of the photodiode 408 for the duration of the IR light pulse, thereby, activating the IR receiver 222 and creating a pulsed receive signal similar to the pulsed signal 312 of FIG. 3. Because noise at the anode of the photodiode 408 can cause undesired photodiode current, the anode trace of the photodiode 408 has a short physical length of about 4 mm. Suitable values for the resistor R9, the capacitors C5 and C6 and the voltage supply V4 are 1000 $\Omega$, 10 $\mu$F, 2.2 $\mu$F and 3.3 V, respectively.

The amplifier section 402 includes resistors R10, R11, R12, R13 and R14, capacitors C7 and C8, a voltage supply V6 and an n-channel FET 410 interconnected as shown in FIG. 4. When the IR receiver 222 is activated, the amplifier section 402 operates as a transimpedance amplifier that amplifies the reverse photodiode current comprising the pulsed receive signal. Suitable values for the resistors R10, R11, R12, R13 and R14, the capacitors C7 and C8 and the voltage supply V6 are 200 k$\Omega$, 1 M$\Omega$, 1 M$\Omega$, 4.7 k$\Omega$, 2 k$\Omega$, 0.1 $\mu$F, 0.1 $\mu$F and 3.3 V, respectively.

The filter section 404 includes capacitors C9 and C10 and a resistor R15 interconnected as shown in FIG. 4. The filter section 404 is a second order high pass filter that filters out the low frequency contents of background interferences from ambient light. This is accomplished by setting the cutoff frequency of the high pass filter high enough to minimize low frequency interference. The cutoff frequency is selected according to the narrowest pulse duration that an IR transmitting element is capable of transmitting. In the illustrated embodiment, the frequency cutoff of the high pass filter is set at 2 kHz. Suitable values for the capacitors C9 and C10 and the resistor R15 are 0.01 $\mu$F, 4700 pF and 10 k$\Omega$, respectively.

The amplifier and hold section 406 includes resistors R16, R17, R18, R19 and R20, capacitor C1, voltage supplies V7, V8 and V9, BJTs 412 and 414 and diode 416 interconnected as shown in FIG. 4. The arrangement of the resistors R16, R17, R18, the voltage supplies V7 and V8 and the BJT 412 amplify the filtered pulsed received signal to logic levels. The voltage supply V9, the BJT 414, the resistor R19 operate as a voltage follower circuit used to buffer the latch circuit formed of the capacitor C11 and the resistor R20. The diode 416 is a peak detector and blocks reverse current from the capacitor C11. The latch circuit formed of the capacitor C11 and the resistor R20 latches the signal TS_DISABLE with a suitable time constant, such as 200 ms. The signal TS_DISABLE is output on connection 231 for the suitable time constant. Suitable values for the resistors R16, R17, R18, R19 and R20, capacitor C11 and voltage supplies V7, V8 and V9 are 100 k$\Omega$, 100 k$\Omega$, 10 k$\Omega$, 47 k$\Omega$, 3.9 M$\Omega$, 0.1 $\mu$F, 3.3 V, 3.3 V and 3.3 V, respectively.

Thus, it can be seen that a sensor controlled user interface eases and improves operation of a portable communication device. While particular embodiments have been shown and described, it will be recognized that modifications may be made. For example, the housing 102 could also employ a movable housing portion (e.g., a flap, a keypad cover, a sliding earpiece) or alternately have a foldable clamshell-type orientation where the speaker bezel 110, the display 114, the keypad 116, the microphone aperture 112 and the sensor 134 are positioned on a front side that extends across two rotatably-joined housing halves. Although the smartphone 100 is shown to employ the keypad 116, one skilled in the art will recognize that the touch screen 128 and the LCD 130 could be configured by the processing section 208 to perform the function of the keypad 116 thereby permitting removal of the keypad 116 and keypad circuit 212 from the smartphone 100. Although shown and described herein as the IR proximity detector 218, the sensor 134 could alternately employ capacitive, inductive, ultrasonic, RF or other sensing techniques to control the user interface. Devices other than the smartphone 100 could also benefit from using the sensor controlled user interface. Such devices include but are not limited to cellular telephones, satellite telephones, PDAs, cordless telephones, two way radios, pagers and the like. It is therefore intended in the appended claims to cover all such changes and modifications which fall within the true spirit and scope of the invention.

What is claimed is:

1. A portable communication device comprising:
   a processing section to control operation of the portable communication device in response to an input signal;
   a user interface comprising a touch sensitive input device coupled to the processing section, the touch sensitive input device actuatable to generate the input signal; and
   a sensor coupled to the user interface, the sensor to disable communication of the input signal to the processing section when the portable communication device is positioned in close proximity to a user, thereby, preventing inadvertent actuation of the touch sensitive input device.

2. A portable communication device according to claim 1 further comprising a housing having a first side, the first side having an opening, the opening having an area no less than approximately twenty-five percent of an area of the first side; and
   wherein the user interface further comprises a display and a keypad, the display is positioned in the opening, and the keypad is formed in the first side.

3. A portable communication device according to claim 2 wherein the touch sensitive input device comprises a touch screen integrated into the display.

4. A portable communication device according to claim 2 wherein the sensor is positioned on the first side.

5. A portable communication device according to claim 4 wherein the sensor is an infrared (IR) proximity detector, the IR proximity detector comprising an IR transmitting element, an IR receiving element and a visible light blocking IR lens beneath which the IR transmitting and receiving elements are positioned, the visible light blocking IR lens fit to the first side.

6. A portable communication device according to claim 1 wherein
   the sensor is an infrared (IR) proximity detector comprising an IR transmitter and an IR receiver, the IR transmitter coupled to the processing section, the IR transmitter to transmit an IR transmission beam while receiving an enable signal from the processing section, the IR receiver to output a disable signal while receiving reflections of the IR transmission beam, and
   the user interface further comprises a driver circuit for the touch sensitive input device, the driver circuit coupled to the IR receiver, the touch sensitive input device and the processing section, the driver circuit to communicate the input signal to the processing section in response to actuations of the touch sensitive input device, the driver circuit to halt communication of the input signal while the disable signal is received.

7. A portable communication device according to claim 6 further comprising a housing having a first side, first and second ends, a speaker bezel formed in the first side proximate to the first end and a microphone aperture formed in the first side proximate to the second end; and wherein the IR proximity detector comprises a visible light blocking IR lens fit to the first side, the IR transmitter comprises an IR transmitting element positioned behind the visible light blocking IR lens, and the IR receiver comprises an IR receiving element positioned behind the visible light blocking IR lens.

8. A portable communication device according to claim 7 wherein the visible light blocking IR lens is further positioned in the speaker bezel, the first side has an opening located between the speaker bezel and the microphone aperture, the opening having an area no less than approximately twenty-five percent of an area of the first side, the user interface further comprises a display positioned in the opening, and the touch sensitive input device is a touch screen integrated into the display.

9. A portable communication device according to claim 7 wherein the IR transmitting element is set to a narrow IR transmission angle, and the IR receiving element is set to have a wide receiving angle.

10. A portable communication device according to claim 1 wherein the sensor is an infrared (IR) proximity detector comprising an IR transmitter and an IR receiver, the IR transmitter to transmit an IR transmission beam comprised of IR pulses.

11. A portable communication device according to claim 10 wherein the IR transmitter comprises an oscillator section to generate a continuous wave signal at a first duty cycle and a pulse shaping section to transform the continuous wave signal into a pulsed signal at a second duty cycle, the second duty cycle less than the first duty cycle.

12. A portable communication device according to claim 11 wherein the pulsed signal comprises pulses and a separation period between consecutive pulses, each of the pulses having a first duration, the separation period no greater than 0.5 secs., the first duration no less than 50 ns.

13. A portable communication device according to claim 11 wherein the IR transmitter further comprises a transmit section, the transmit section to amplify a magnitude of pulses of the pulsed signal.

14. A portable communication device according to claim 10 wherein the IR receiver further comprises a high pass filter.

15. A portable communication device according to claim 1 wherein the portable communication device is a smartphone.

16. A smartphone comprising:

a housing having a first side and first and second ends;

a speaker bezel formed in the first side proximate to the first end;

a microphone aperture formed in the first side proximate to the second end;

a substantially rectangular opening formed in the first side between the speaker bezel and the microphone aperture, the substantially rectangular opening having an area no less than approximately twenty-five percent of an area of the first side;

a display positioned in the substantially rectangular opening, the display having first and second layers, the first layer comprising a touch screen, the second layer comprising a liquid crystal display (LCD), the first layer being substantially transparent to facilitate viewing of the LCD;

a radio frequency (RF) transceiver section positioned in the housing;

a processing section positioned in the housing and coupled to the RF transceiver section, the processing section, in response to an input signal, to control the smartphone to perform one of a radiotelephone function and a personal computer or personal digital assistant function;

a touch screen driver circuit positioned in the housing and coupled to the processing section, the touch screen driver circuit to communicate the input signal to the processing section in response to an actuation of the touch screen; and a sensor positioned on the first side, the sensor coupled to the processing section and the touch screen driver circuit, the sensor to disable the touch screen driver circuit from communicating the input signal to the processing section when the smartphone is positioned in close proximity to a user.

17. A smartphone according to claim 16 wherein the sensor is an infrared (IR) proximity detector comprising an IR transmitter coupled to the processing section and an IR receiver coupled to the touch screen driver circuit, the IR transmitter to transmit an IR transmission beam comprised of IR pulses.

18. A smartphone according to claim 17 wherein the IR proximity detector comprises a visible light blocking IR lens fit to the first side, the IR transmitter comprises an IR transmitting element positioned in the housing behind the visible light blocking IR lens, and the IR receiver comprises an IR receiving element positioned in the housing behind the visible light blocking IR lens.

19. A smartphone according to claim 17 wherein the IR transmitter comprises an oscillator section to generate a continuous wave signal at a first duty cycle and a pulse shaping section to transform the continuous wave signal into a pulsed signal at a second duty cycle, the second duty cycle less than the first duty cycle.

20. A smartphone according to claim 19 wherein the pulsed signal comprises pulses and a separation period between consecutive pulses, each of the pulses having a first duration, the separation period no greater than 0.5 secs., the first duration no less than 50 ns.

* * * * *